United States Patent
Tominaga et al.

(10) Patent No.: US 6,901,036 B2
(45) Date of Patent: May 31, 2005

(54) METHOD AND APPARATUS FOR REPRODUCING AN OPTICAL SIGNAL

(75) Inventors: Junji Tominaga, Tsukuba (JP); Takashi Nakano, Tsukuba (JP); Nobufumi Atoda, Tsukuba (JP); Akira Sato, Shiga-ken (JP); Manami Kuiseko, Kyoto (JP); Takashi Kikukawa, Tsukuba (JP)

(73) Assignees: National Institute of Advanced Industrial Science and Technology, Tokyo (JP); Minolta Co., Ltd., Osaka (JP); TDK Corporation, Tokyo (JP)

( * ) Notice: Subject to any disclaimer, the term of this patent is extended or adjusted under 35 U.S.C. 154(b) by 381 days.

(21) Appl. No.: 09/942,036

(22) Filed: Aug. 30, 2001

(65) Prior Publication Data

US 2002/0027861 A1 Mar. 7, 2002

(30) Foreign Application Priority Data

Sep. 4, 2000 (JP) ........................................ 2000-267009

(51) Int. Cl.$^7$ ................................................ G11B 7/00
(52) U.S. Cl. ............................ 369/44.24; 369/112.01; 369/118; 369/44.23
(58) Field of Search ........................ 369/44.23, 44.24, 369/112.01, 118, 112.22, 59.13

(56) References Cited

U.S. PATENT DOCUMENTS 5,610,895 A * 3/1997 Izumi et al. ............. 369/44.24
6,226,258 B1 5/2001 Tominaga et al. ........... 369/283

FOREIGN PATENT DOCUMENTS

| JP | 5-205314 | | 8/1993 | |
| JP | 05234121 A | * | 9/1993 | ........... G11B/7/135 |
| JP | 06012697 A | * | 1/1994 | ........... G11B/7/00 |
| JP | 6-183152 | | 7/1994 | |
| JP | 11-250493 | | 9/1999 | |

OTHER PUBLICATIONS

High Density ROM Disc with Super–Resolution Reflective Layer TDK R&D Ctr. Kikukawa T., Kato T., et al. International Symposium on Optical Memory 2000 (No. Fr–L–04).
High Density ROM Disc with Super–Resolution Reflective Layer TDK R&D Ctr. Kikukawa T., Kato T., et al. Extended Abstracts (the 47th Spring Meeting, 2000); the Japanese Society of Applied Physics and Related Societies (No. 28–p–R–2) (with English translation).

* cited by examiner

Primary Examiner—David L. Ometz
Assistant Examiner—Jorge L. Ortiz-Criado
(74) Attorney, Agent, or Firm—Morrison & Foerster LLP

(57) ABSTRACT

An apparatus for reproducing information stored in an optical recording medium which comprises marks or pits which are arranged at a pitch less than λ/2NA, wherein λ is a wavelength of light used for reproduction and NA is an numerical aperture of an objective lens. The apparatus generally comprises a laser diode, a polarization beam splitter, an objective lens, beam splitters, a low-frequency light detecting system with a photodetector, a high-frequency light detecting system with a photodetector, and a signal processing circuit for combining detection signals from the photodetectors. In the high-frequency light detecting system, before a convergent lens, a shielding band is provided so as to shield the middle of a bundle of rays of reproduction light.

3 Claims, 2 Drawing Sheets

METHOD AND APPARATUS FOR REPRODUCING AN OPTICAL SIGNAL

This application is based on Japanese patent application No. 2000-267009, the contents of which are hereby incorporated by reference.

BACKGROUND OF THE INVENTION

1. Field of the Invention

The present invention relates to a method and an apparatus for reproducing an optical signal, and more particularly to a method and an apparatus for reading out an optical signal from a super-resolution optical disk and reproducing information stored in the optical disk.

2. Description of Related Art

In the field of optical recording, high-density recording techniques have been demanded, and recently, a super-resolution optical disk which improves the recording density by using a recording medium which changes the structures of the materials included when light is applied thereto is suggested.

The minimum reproducible mark/pit pitch of an optical disk usually depends on the wavelength $\lambda$ in the vacuum of light used for reproduction and the numerical aperture NA of an objective lens, and the minimum reproducible mark/pit pitch is usually $\lambda/2NA$. A super-resolution optical disk, however, permits reproduction of marks or pits arranged at a pitch less than the usual minimum reproducible mark/pit pitch.

Japanese Patent Laid Open Publication No. 6-183152 discloses that a layer of a phase changing material, such as a Bi alloy, a Te alloy or the like, is formed on a disk with pits thereon and that super-resolution readout is achieved by converging light on the phase changing material layer to turn the phase changing material partly (on the pits) into a liquid phase. Japanese Patent Laid Open Publication No. 5-205314 discloses that a layer of a lanthanoid material is formed on a disk with pits thereon and that super-resolution readout is achieved by changing the reflectance by temperature gradient.

Japanese Patent Laid Open Publication No. 11-250493 discloses a structure wherein a mask layer is provided for a phase changing recording layer made of GeSbTe and wherein an intermediate layer which is made of SiN and which has a thickness of 30 nm is provided between the mask layer and the recording layer. In the structure, when an optical system wherein the wavelength $\lambda$ is 488 nm and wherein the numerical aperture NA is 0.6 (the length of the minimum reproducible mark is usually 200 nm) is used, even signals from marks with lengths less than 100 nm are detectable.

In the Japan Symposium on Applied Physics 2000, Spring, at presentation No. 28-p-R-2, Kikukawa et al. presented that in a structure wherein Ge, Si, W, etc. are used as reflecting films in a ROM type optical disk with fine pits thereon, when an optical system wherein the wavelength $\lambda$ is 635 nm and wherein the numerical aperture NA is 0.6 (the length of the minimum reproducible pit is usually 270 nm) was used, a pit with a length of 200 nm could be reproduced. This super-resolution disk is capable of improving the recording density with no particular changes in the optical system. However, the problem is that the CNR (carrier to noise ratio) of small marks or pits is low. Also, Kikukawa et al. found out another problem in a ROM type optical disk with a reflecting film of Ge or the like that when a pit with a length less than the usual minimum reproducible pit length is located between pits with lengths more than the usual minimum reproducible pit length, a signal is partly omitted. This was presented in the International Symposium on Optical Memory 2000, at presentation No. Fr-L-04.

SUMMARY OF THE INVENTION

An object of the present invention is to provide a method and an apparatus for reproducing an optical signal which are capable of reading out information from an optical recording medium which comprises fine marks or pits with lengths less than the usual minimum reproducible mark/pit length and reproducing the information at a high CNR.

Another object of the present invention is to provide a method and an apparatus for reproducing an optical signal which are capable of amplifying an output of a signal which includes information on a mark or a pit with a length less than the usual minimum reproducible mark/pit length.

Further, another object of the present invention is to provide a method and an apparatus for reproducing an optical signal which are capable of avoiding omission of a signal which includes information on a mark or a pit with a length less than the usual minimum reproducible mark/pit length when information on marks or pits of different lengths is to be reproduced.

In order to attain the objects, according to the present invention, a first optical signal reproducing apparatus for reproducing information stored in an optical recording medium which comprises marks or pits which are arranged at a pitch less than $\lambda/2NA$, wherein $\lambda$ is a wavelength of light used for reproduction and NA is an numerical aperture of an objective lens, comprises a shielding band which is located in an optical path of an optical system for detecting light coming from the optical recording medium in such a position to shield at least a middle of a bundle of rays.

A second optical signal reproducing apparatus according to the present invention comprises: a first detecting system for generally detecting optical signals from marks or pits which are arranged at a pitch not less than $\lambda/2NA$; a second detecting system for generally detecting optical signals from marks or pits which are arranged at a pitch less than $\lambda/2NA$; and a signal processing circuit for reproducing information by combining the signals detected by the first detecting system with the signals detected by the second detecting system. Preferably, the second detecting system comprises a shielding band which shields at least the middle of a bundle of rays.

Further, according to the present invention, a method for reproducing information stored in an optical recording medium which comprises marks or pits which are arranged at a pitch less than $\lambda/2NA$, wherein $\lambda$ is a wavelength of light used for reproduction and NA is an numerical aperture of an objective lens, comprises the steps of: detecting first optical signals from marks or pits which are arranged at a pitch not less than $\lambda/2NA$; detecting second optical signals from marks or pits which are arranged at a pitch less than $\lambda/2NA$ while shielding at least a middle of each bundle of rays coming from each of the marks or pits so as to detect the rays located in a periphery of each bundle with respect to a track direction; and reproducing information from the first signals and the second signals.

A super-resolution phenomenon is caused by arrangement of fine marks and pits. The spatial frequency of a signal to be reproduced is beyond the diffraction limit of an optical system. By applying a high readout power, the degree of modulation of a reproduction signal can be heightened, while noise from the substrate of a super-resolution disk (disk noise) is not heightened. What affects the reproduction of the signal is white noise of an amplifier which is caused by an increase in the quantity of incident light.

In the optical signal reproducing apparatus and the optical signal reproducing method according to the present invention, the shielding band shields at least the middle of a bundle of rays of reproduction light, and thereby, the light in the middle of the pupil is cut in such an extent not to influence the periphery around the pupil where signal components pass. Consequently, noise in the frequencies around the signal is suppressed, and the CNR of the reproduction signal is increased.

In a super-resolution optical disk, it is thought that optical signals with high spatial frequencies which are detected by a super-resolution effect pass in the periphery of the pupil of an optical detecting system. Accordingly, for detection of optical signals from marks or pits with high spatial frequencies, by detecting only rays in the periphery of a bundle or by providing an optical system which detects only rays in the periphery of a bundle, signals from marks or pits which are arranged at a pitch less than the usual minimum reproducible mark/pit pitch can be detected emphatically. Then, the detected signals are combined with signals detected by a detecting system for detecting signals from marks or pits which are arranged at a pitch not less than the usual minimum reproducible mark/pit pitch, in which a bundle of rays, including the middle of the pupil, is wholly detected. In this way, in reproducing information from marks or pits of different lengths, the outputs of signals from marks or pits which are arranged at a pitch less than the usual minimum reproducible mark/pit pitch can be substantially amplified.

Moreover, by shielding low-frequency components with high signal strengths, superimposition of low-frequency components which are highly outputted from marks or pits which are arranged at a pitch not less than the usual minimum reproducible mark/pit pitch over high-frequency components which are lowly outputted from marks or pits which are arranged at a pitch less than the usual minimum reproducible mark/pit pitch can be prevented, and consequently, omission of the low outputs from marks or pits which are arranged at a pitch less than the usual minimum reproducible mark/pit pitch can be avoided. As already mentioned, in reproducing information from marks or pits of different lengths, by detecting a bundle of rays passing through the periphery of a pupil and a bundle of rays passing through the middle of the pupil with separate detecting systems and by combining the outputs from these detecting systems, omission of signals from marks or pits which are arranged at a pitch less than the usual minimum reproducible mark/pit pitch can be avoided, and simultaneously, the outputs of the signals from marks or pits which are arranged at a pitch less than the usual minimum reproducible mark/pit pitch can be substantially amplified.

In this specification, "pitch" means the pitch of marks or pits in a scanning direction.

BRIEF DESCRIPTION OF THE DRAWINGS

These and other objects and features of the present invention will be apparent from the following description with reference to the accompanying drawings, in which.

DETAILED DESCRIPTION OF THE PREFERRED EMBODIMENTS

Embodiments of a method and an apparatus for reproducing an optical signal according to the present invention are hereinafter described with reference to the accompanying drawings.

Figure 1:
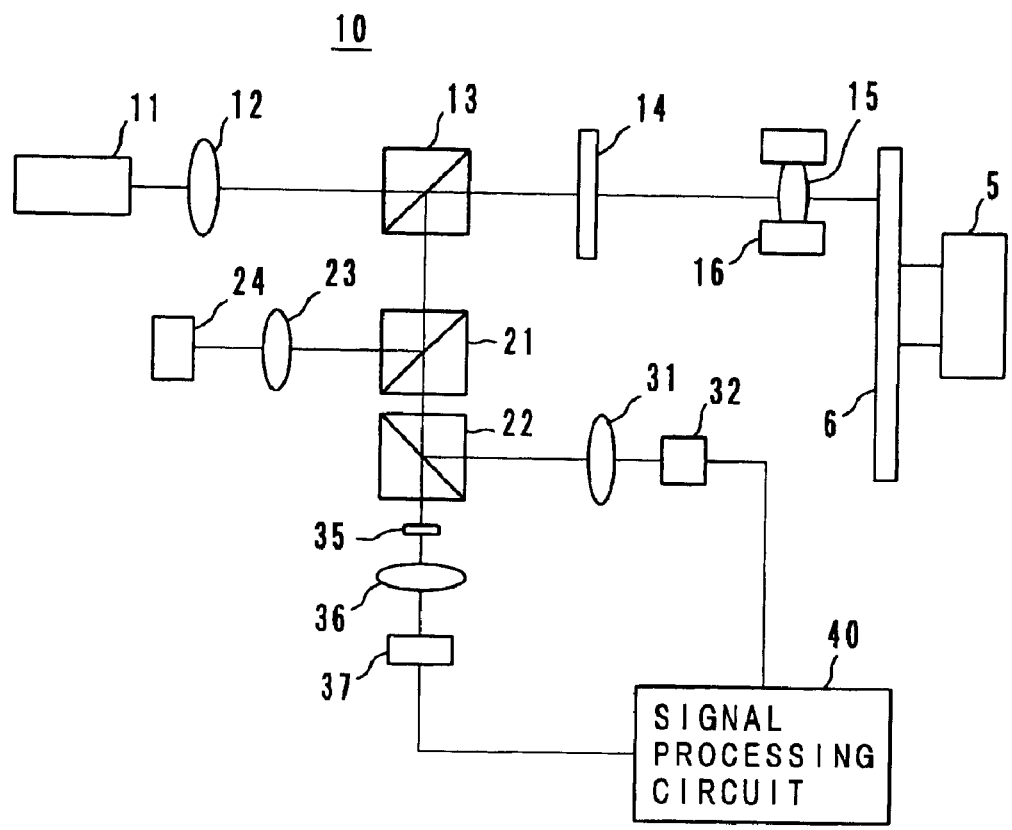
FIG. 1 is a schematic view of an optical signal reproducing apparatus which is an embodiment of the present invention.
Figure 2:
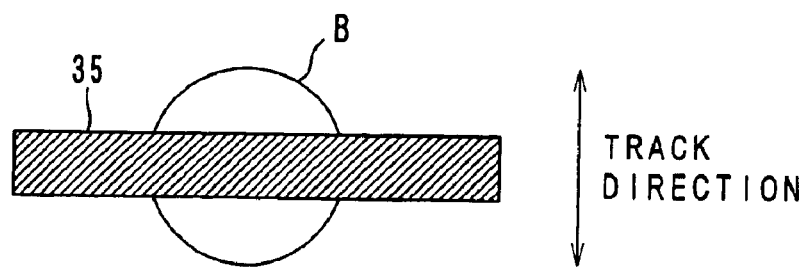
FIG. 2 is an illustration which shows the positional relationship between a shielding band and a light beam in the optical signal reproducing apparatus.

First, referring to FIG. 1, an optical signal reproducing apparatus 10 which is an embodiment of the present invention is described. This apparatus 10 reproduces information recorded in a super-resolution optical disk 6 while rotating the optical disk 6 in a direction at a constant speed by use of a spindle motor 5.

The super-resolution optical disk 6 has a Ge reflecting layer with a thickness of 15 nm on a polycarbonate substrate with pits thereon. The minimum pit length is 290 nm, and the minimum pitch is 580 nm.

The optical signal reproducing apparatus 10 generally comprises, as an irradiating system, a laser diode 11, a collimator lens 12, a polarization beam splitter 13, a quarter wavelength plate 14 and an objective lens 15 with a driving unit 16. For reproduction of information, the apparatus 10 comprises beam splitters 21 and 22, an anamorphic lens 23 and a four-segmented detector 24.

Further, as a low-frequency light detecting system, the apparatus 10 comprises a convergent lens 31 and a photodetector 32, and as a high-frequency light detecting system, the apparatus 10 comprises a shielding band 35, a convergent lens 36 and a photodetector 37. A signal processing circuit 40 for combining signals from the photodetectors 32 and 37 is also provided.

Next, the operation of the optical signal reproducing apparatus 10 is described.

The laser diode 11 emits a laser beam with a wavelength of 630 nm as a divergent light, and this laser beam is collimated by the collimator lens 12 into a parallel light. Then, the light passes through the polarization beam splitter 13 and is converted into a linearly polarized light by the quarter wavelength plate 14. The linearly polarized light beam is converged on a pit on the super-resolution optical disk 16 through the objective lens 15. This convergent light beam is reflected and modulated on the pit. This reflected and modulated light is referred to as a reproduction light. The reproduction light is collimated by the objective lens 15 and passes through the quarter wavelength plate 14. Then, the reproduction light is deflected by the polarization beam splitter 13 toward the beam splitter 21.

Further, the reproduction light is split by the beam splitter 21, and a part of the reproduction light passes through the anamorphic lens 23 and is incident to the four-segmented detector 24, where focusing and tracking correction are carried out. More specifically, based on the reproduction light which has been incident to the four-segmented detector 24, the amount of defocus and the track shift are calculated, and the results are fed back to the driving unit 16 of the objective lens 15.

The other part of the reproduction light passes through the beam splitter 21 and is further split by the next beam splitter 22. A part of the light is directed to the low-frequency light detecting system, and the other is directed to the high-frequency light detecting system. Then, these parts of light are detected by the photodetectors 32 and 37 respectively.

In the high-frequency light detecting system, the shielding band 35 is inserted before the convergent lens 36. As FIG.

2 shows, this shielding band 35 is located in such a position to shield the middle of the light beam B to be detected by the photodetector 37. The diameter of the light beam B is 4 mm, and the width (the dimension in a track direction) of the shielding band 35 is 3.8 mm. In this optical signal reproducing apparatus 10, the usual minimum reproducible pitch (λ/2NA) is approximately 600 nm. The readout power is 3 mW.

Figure 3A:
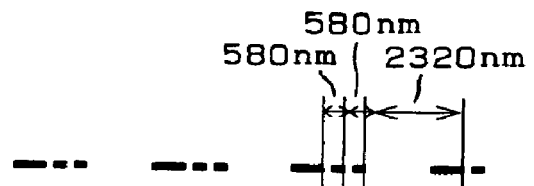
FIGS. 3a, 3b, 3c and 3d are charts which show recording pits and waveforms of reproduction signals.
Figure 3B:
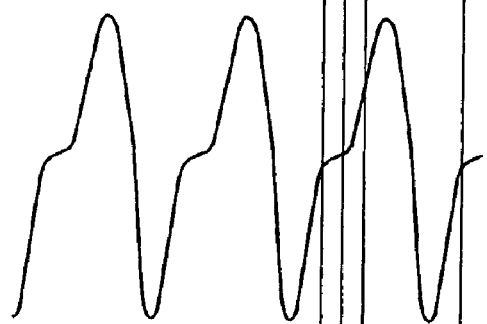
Figure 3C:
Figure 3D:
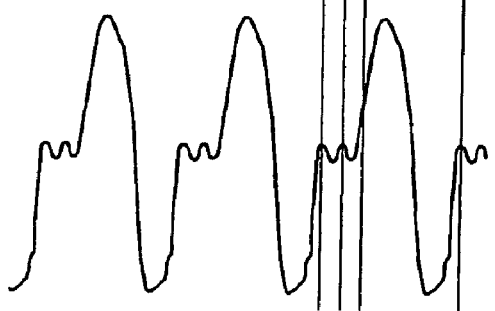

FIG. 3a shows pits which are sequentially formed on the super-resolution optical disk 6; FIG. 3b shows a signal waveform of the reproduction light detected by the photodetector 32 of the low-frequency light detecting system; FIG. 3c shows a signal waveform of the reproduction light detected by the photodetector 37 of the high-frequency light detecting system; and FIG. 3d is a waveform of a composite signal which is generated by combining the signals shown in FIGS. 3b and 3c in the signal processing circuit 40.

In the low-frequency light detecting system, as is apparent from the waveform shown in FIG. 3b, the pits arranged at the minimum pitch (580 nm) are not detected and are omitted. In the high-frequency light detecting system, however, as is apparent from the waveform shown in FIG. 3c, the pits arranged at the minimum pitch are detected, and the information thereon are reproduced. Moreover, the edges of these pits are emphasized.

The reason why the information on the pits arranged at a pitch less than the usual minimum reproducible pitch can be reproduced is that the shielding band 35 is provided in the optical path so as to shield the middle of the light beam which is directed to the photodetector 37. In other words, by shielding the middle of the light beam with the shielding band 35, the light in the middle of pupil is cut in an extent not to influence the periphery of the pupil where signal components pass, and the noise in the frequencies around the signal is suppressed. Consequently, the CNR of the reproduction signal is heightened.

It is thought that an optical signal with a high spatial frequency passes in the periphery around the pupil of an optical system. The shielding band 35 permits only such signals to pass through, and the photodetector 37 particularly detects signals which carry information on marks or pits which are arranged at a pitch less than the usual minimum reproducible mark/pit pitch.

Further, by combining reproduction signals obtained from pits which are arranged at a pitch less than the usual minimum reproducible pitch with reproduction signals obtained from pits which are arranged at a pitch not less than the usual minimum reproducible pitch, the outputs of the signals from the pits which are arranged at a pitch less than the usual minimum reproducible pitch are substantially amplified, and consequently, there are no possibilities that these reproduction signals from the pits which are arranged at a pitch less than the usual minimum reproducible pitch will be omitted.

Other Embodiments

The present invention is adaptable for various kinds of storage media as well as the ROM type super-resolution optical disk. The details of the irradiating system, the optical system of the reproduction light detecting system can be arbitrarily designed. Also, the shield is not necessarily in the form of a band.

Although the present invention has been described in connection with the preferred embodiments above, it is to be noted that various changes and modifications are possible to those who are skilled in the art. Such changes and modifications are to be understood as being within the scope of the present invention.

What is claimed is:

1. An apparatus for reproducing information stored in an optical recording medium which comprises marks or pits which are arranged at a pitch less than $\lambda/2NA$, wherein $\lambda$ is a wavelength of light used for reproduction and NA is a numerical aperture of an objective lens, said apparatus comprising:

a first detecting system for generally detecting optical signals from marks or pits which are arranged at a pitch not less than $\lambda/2NA$;

a second detecting system for generally detecting optical signals from marks or pits which are arranged at a pitch less than $\lambda/2NA$; and a signal processing circuit for reproducing information by combining the signals detected by the first detecting system with the signals detected by the second detecting system.

2. An apparatus according to claim 1, wherein the second detecting system comprises a shielding band for shielding at least a middle of a bundle of rays.

3. A method for reproducing information stored in an optical recording medium which comprises marks or pits which are arranged at a pitch less than $\lambda/2NA$, wherein $\lambda$ is a wavelength of light used for reproduction and NA is a numerical aperture of an objective lens, said method comprising the steps of:

detecting first optical signals from marks or pits which are arranged at a pitch not less than $\lambda/2NA$;

detecting second optical signals from marks or pits which are arranged at a pitch less than $\lambda/2NA$ while shielding at least a middle of each bundle of rays coming from each of the marks or pits so as to detect the rays located in a periphery of each bundle with respect to a track direction; and reproducing the information by combining the first optical signals and the second optical signals.

* * * * *